(12) United States Patent
Ro et al.

(10) Patent No.: US 9,696,578 B2
(45) Date of Patent: Jul. 4, 2017

(54) DISPLAY DEVICE AND MANUFACTURING METHOD THEREOF

(71) Applicant: Samsung Display Co., Ltd., Yongin (KR)

(72) Inventors: Sung In Ro, Hwaseong-si (KR); Jeong Ho Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 21 days.

(21) Appl. No.: 14/741,900

(22) Filed: Jun. 17, 2015

(65) Prior Publication Data

US 2016/0202544 A1 Jul. 14, 2016

(30) Foreign Application Priority Data

Jan. 13, 2015 (KR) ........................ 10-2015-0006325

(51) Int. Cl.
*G02B 5/22* (2006.01)
*G02F 1/1335* (2006.01)
(Continued)

(52) U.S. Cl.
CPC ....... *G02F 1/133514* (2013.01); *G02B 5/201* (2013.01); *G02F 1/1362* (2013.01);
(Continued)

(58) Field of Classification Search
CPC ........ F21S 10/00; F21S 10/005; F21S 10/007; F21S 10/02; F21S 10/023; F21S 10/026;
(Continued)

(56) References Cited

U.S. PATENT DOCUMENTS 7,829,897 B2 11/2010 Song et al.
8,455,870 B2 6/2013 Kim et al.
(Continued)

FOREIGN PATENT DOCUMENTS

JP 09-015589 1/1997
JP 2003-131020 5/2003
(Continued)

OTHER PUBLICATIONS

Extended European Search Report issued May 20, 2016 in European Patent Application No. 15189758.4.

*Primary Examiner* — Jade R Chwasz
(74) *Attorney, Agent, or Firm* — H.C. Park & Associates, PLC

(57) ABSTRACT

A display device including a substrate, a plurality of data lines disposed on the substrate, a first color filter disposed between a first data line and a second data line that are adjacent to each other among the data lines, a first dummy color filter configured to overlap a third data line that is adjacent to the first data line, be separated from the first color filter, and display a same color as that of the first color filter, and a second color filter disposed at a region between the first data line and the third data line and configured to display a color different from that of the first color filter. A thickness of the first dummy color filter is smaller than that of the first color filter, and the second color filter is disposed on the first dummy color filter.

23 Claims, 14 Drawing Sheets

(51) Int. Cl.
  *G02B 5/20* (2006.01)
  *G02F 1/1362* (2006.01)
  *G02F 1/136* (2006.01)
  *G02F 1/1343* (2006.01)

(52) U.S. Cl.
  CPC .. *G02F 1/133516* (2013.01); *G02F 1/136286* (2013.01); *G02F 2001/13606* (2013.01); *G02F 2001/134372* (2013.01); *G02F 2001/136222* (2013.01); *G02F 2001/136295* (2013.01); *G02F 2201/40* (2013.01)

(58) Field of Classification Search
  CPC ...... G02B 26/007; G02B 26/008; G02B 5/20; G02B 5/201; G02B 5/205; G02B 5/22; G02B 5/223; G02B 5/226; G02B 5/23; G02B 7/006; G02B 5/3058; G03B 17/12; G02F 1/1335; G02F 1/134309; G02F 1/136286; G02F 1/13439; G02F 1/133516; G02F 1/1333; G02F 1/1362; G02F 2001/136222; G02F 2001/134372; G02F 2001/13606; G02F 2001/136295; G02F 2201/40; H01L 27/124
  USPC .......................................... 359/885, 890, 891
  See application file for complete search history.

(56) References Cited

U.S. PATENT DOCUMENTS

| | | | |
|---|---|---|---|
| 8,493,523 | B2 | 7/2013 | Kim et al. |
| 8,767,147 | B2 | 7/2014 | Yang et al. |
| 2005/0253984 | A1* | 11/2005 | Kim ..................... G02F 1/1362 349/106 |
| 2006/0033878 | A1 | 2/2006 | Sawasaki |
| 2010/0321283 | A1 | 12/2010 | Mizuno et al. |
| 2015/0131017 | A1 | 5/2015 | Ro et al. |
| 2015/0146143 | A1 | 5/2015 | Kim et al. |

FOREIGN PATENT DOCUMENTS

| | | |
|---|---|---|
| JP | 2004-045726 | 2/2004 |
| JP | 2006-337590 | 12/2006 |
| KR | 10-2008-0093504 | 10/2008 |
| KR | 10-2009-0117308 | 11/2009 |
| KR | 10-2011-0021586 | 3/2011 |
| KR | 10-2011-0038477 | 4/2011 |
| KR | 10-1101021 | 12/2011 |

* cited by examiner

DISPLAY DEVICE AND MANUFACTURING METHOD THEREOF

CROSS-REFERENCE TO RELATED APPLICATION

This application claims priority from and the benefit of Korean Patent Application No. 10-2015-0006325, filed on Jan. 13, 2015, which is hereby incorporated by reference for all purposes as if fully set forth herein.

BACKGROUND

Field

Exemplary embodiments relate to a display device and a manufacturing method thereof.

Discussion of the Background

In general, display devices, such as liquid crystal displays (LCDs) and organic light emitting diode displays, include a display substrate having a plurality of pixels including switching elements and a plurality of signal lines, a data driver applying, as a data signal, a gray voltage corresponding to an input image signal among a plurality of gray voltages to data lines, and the like.

The liquid crystal displays may include at least one display panel including field generating electrodes such as a pixel electrode and a common electrode, and a liquid crystal layer having dielectric anisotropy. The pixel electrodes are arranged in a matrix form, and are connected to respective switching elements such as thin film transistors (TFTs) to sequentially receive data voltages row by row. The common electrode receives a common voltage Vcom. A voltage can be supplied to the pixel electrodes and the common electrode so as to generate an electric field at the liquid crystal layer, and transmittance of light passing through the liquid crystal layer can be controlled by adjusting the magnitude of the electric field, to thereby obtain desired images.

The two field generating electrodes of the pixel electrode and the common electrode may be respectively included in two display panels which are disposed to face each other, or the two field generating electrodes may be disposed in one display panel. When two panels are used, one of the facing display panels may include the pixel electrode of the field generating electrodes, to which a data voltage is applied, and a plurality of thin film transistors arranged in a matrix form. The other display panel may include a color filter for representing primary colors such as red, green, and blue and a light blocking member for preventing light leakage between pixels.

However, in this liquid crystal display, since the pixel electrode, the thin film transistors, and the color filter or the light blocking member are formed in the different display panels, it is difficult to make an accurate alignment between the pixel electrode and the color filter or between the pixel electrode and the light blocking member, which may cause an alignment error.

To solve the problem, a structure for forming the light blocking member in the same display panel as the pixel electrode and the thin film transistor has been proposed. In this case, the color filter may be formed in the same display panel as the pixel electrode. As such, the light blocking member may be integrally formed in the display panel in which the pixel electrode and the thin film transistor are formed, thereby achieving a high aperture ratio and high transmittance of the liquid crystal display.

The pixel electrode and the common electrode can be mounted in one display panel in which signal lines such as data lines and the thin film transistors are formed.

In a structure in which field generating electrodes such as a pixel electrode and a common electrode are formed on the same substrate as signal lines such as data lines, capacitive coupling between the data lines and the field generating electrodes may generate crosstalk and distort an electric field, thereby generating light leakage. In order to prevent the light leakage generation, an organic film may be interposed between the field generating electrodes and the data lines, but this may lead to many drawbacks such as a cost for a material of the organic film, addition of a mask and a process for forming the organic film, an effect caused by penetration of the organic film material into another layer, and transmittance reduction caused by the organic film.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device and a manufacturing method thereof, having advantages of being capable of preventing light leakage and display errors caused by parasitic capacitance between field generating electrodes and data lines without using an organic film, and accomplishing a low manufacturing cost of the display device and a simplified manufacturing process.

Additional aspects will be set forth in the detailed description which follows, and, in part, will be apparent from the disclosure, or may be learned by practice of the inventive concept.

An exemplary embodiment discloses a display device including a substrate, a plurality of data lines disposed on the substrate, a first color filter disposed between a first data line and a second data line that are adjacent to each other among the data lines, a first dummy color filter configured to overlap a third data line that is adjacent to the first data line, be separated from the first color filter, and display a same color as that of the first color filter, and a second color filter disposed at a region between the first data line and the third data line and configured to display a color different from that of the first color filter. A thickness of the first dummy color filter is smaller than that of the first color filter, and the second color filter is disposed on the first dummy color filter.

An exemplary embodiment also discloses disposing a plurality of data lines on a substrate, disposing a first color filter at a region between a first data line and a second data line of the data lines and a first dummy color filter to overlap a third data line that is adjacent to the first data line and to be separated from the first color filter by coating a first color filter material on the substrate and data lines and exposing the first color filter material with a photomask including a halftone region, and disposing a second color filter at a region between the first data line and the third data line and on the first dummy color filter by coating a second color filter material on the substrate and the data lines and exposing the second color filter material. The first dummy color filter is formed to correspond to the halftone region of the photomask.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
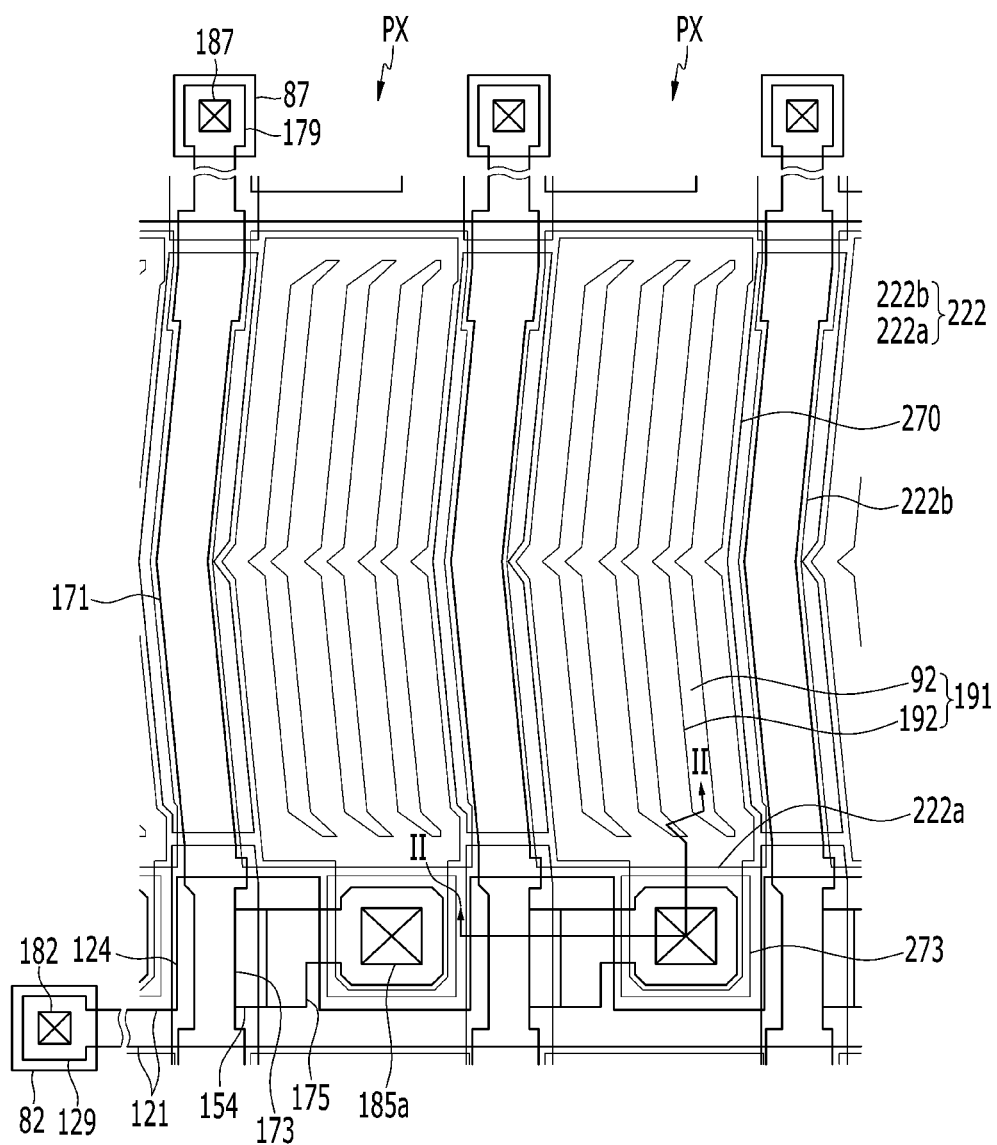
FIG. 1 is a layout view of one pixel of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In a structure in which field generating electrodes such as a pixel electrode and a common electrode are disposed on the same substrate as signal lines such as data lines, capacitive coupling between the data lines and the field generating electrodes may generate crosstalk and distort an electric field, thereby generating light leakage. In order to prevent the light leakage generation, an organic film may be interposed between the field generating electrodes and the data lines. However, this may lead to many drawbacks such as a high cost for the organic film, the addition of a mask and a process for forming the organic film, an effect caused by penetration of the organic film material into another layer, and a transmittance reduction caused by the organic film.

Various embodiments described below reduce crosstalk and remove the necessity to interpose an organic film including an organic material between the data line and the common electrode.

Figure 2:
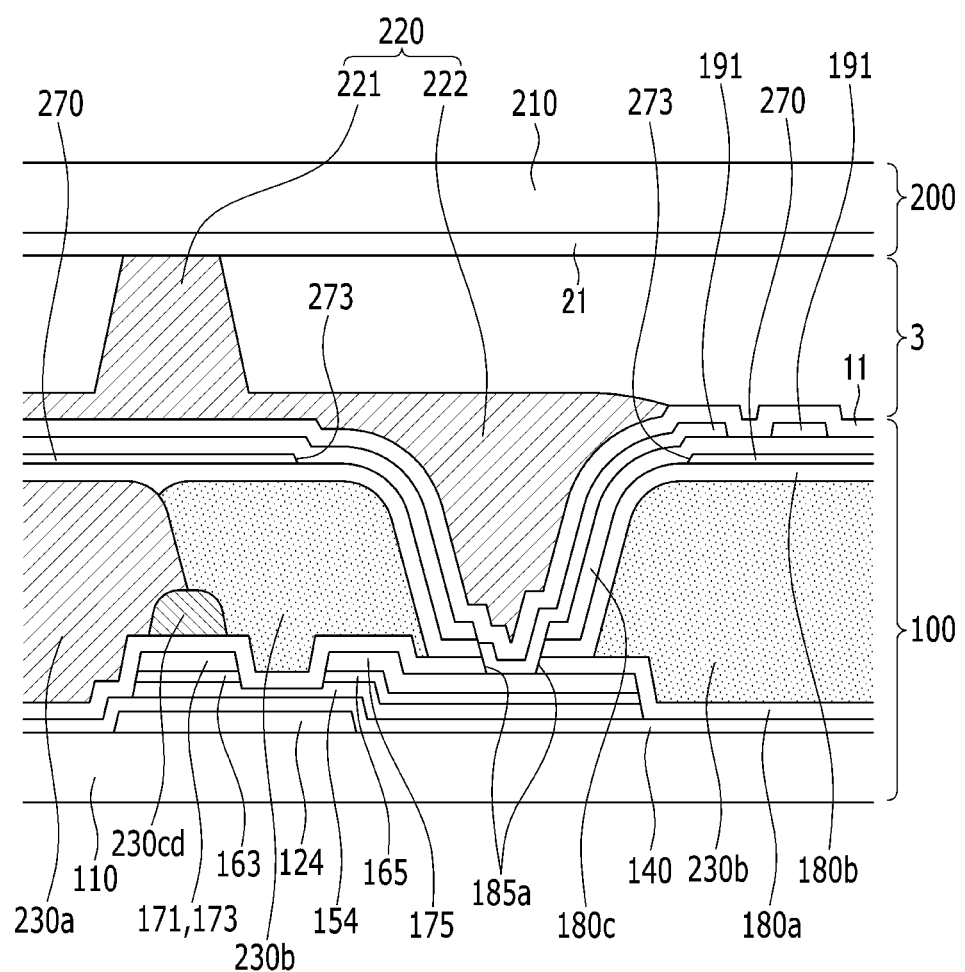
FIG. 2 is a cross-sectional view of the display device of FIG. 1 taken along a line II-II.
Figure 3:
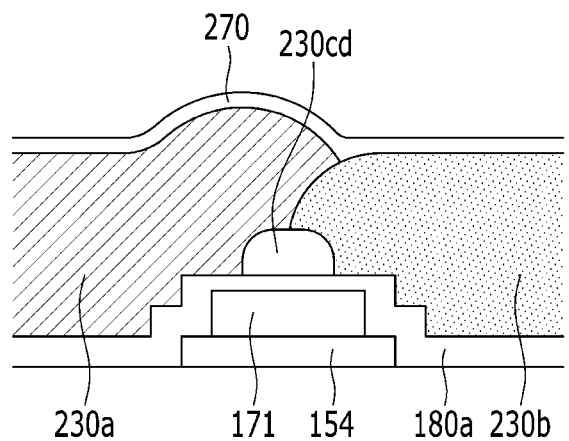
FIG. 3 is a cross-sectional view illustrating a boundary between two adjacent pixels and its vicinity in a display device according to an exemplary embodiment.
Figure 4:
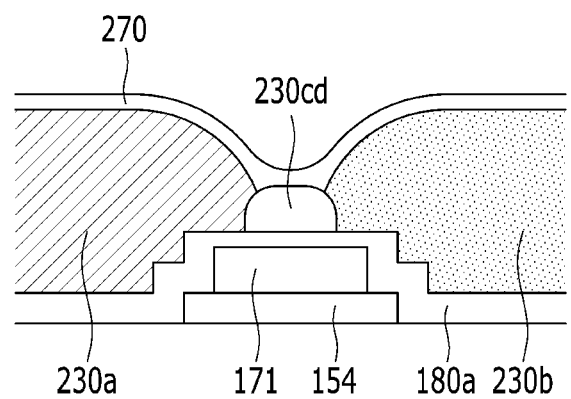
FIG. 4 is a cross-sectional view illustrating a boundary between two adjacent pixels and its vicinity in a display device according to an exemplary embodiment.

FIG. 1 is a layout view of one pixel of a display device according to an exemplary embodiment, FIG. 2 is a cross-sectional view of the display device taken along a line II-II, FIG. 3 is a cross-sectional view illustrating a boundary between two adjacent pixels and its vicinity in a display device according to an exemplary embodiment, and FIG. 4 is a cross-sectional view illustrating a boundary between two adjacent pixels and its vicinity in a display device according to an exemplary embodiment.

Referring to FIGS. 1 and 2, the display device according to an exemplary embodiment may be, e.g., a liquid crystal display, and may include at least one display panel 100 and 200 and a liquid crystal layer 3. The present exemplary embodiment is mainly described with respect to a liquid crystal display that includes a lower panel 100 and an upper panel 200 disposed to face each other, and a liquid crystal layer 3 interposed therebetween, but a structure of exemplary embodiments of the display device is not limited thereto. For example, the liquid crystal display may include one display panel and a liquid crystal layer.

First, the upper panel 200 will be described. The upper panel 200 includes a substrate 210 made of glass or plastic, and an alignment layer 21 may be coated on the substrate 210. The alignment layer 21 may be a horizontal alignment layer. The alignment layer 21 may be rubbed in a direction. However, according to another exemplary embodiment of the present invention, the alignment layer 21 may be photo-aligned by including a photo-reactive material.

Next, the lower panel 100 will be described. A gate conductor including gate lines 121 is disposed on a substrate 110 made of, e.g., transparent glass or plastic. The gate lines 121 may each include a gate electrode 124 and an end portion 129. The gate conductor may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However the gate conductor may have a multilayered structure including at least two conductive layers having different physical properties. A gate insulating layer 140 made of a silicon nitride (SiNx), a silicon oxide (SiOx), or the like is formed on the gate conductor. The gate insulating layer 140 may have a multilayered structure including at least two insulating layers having different physical properties.

A semiconductor 154 is disposed on the gate insulating layer 140. The semiconductor 154 may include amorphous silicon, polysilicon, or an oxide semiconductor.

Ohmic contacts 163 and 165 may be further disposed on the semiconductor 154. The ohmic contacts 163 and 165 may be made of a material such as n+ hydrogenated amorphous silicon in which an n-type impurity such as phosphorus is doped at a high concentration, or of a silicide. The ohmic contacts 163 and 165 may form a pair to be disposed on the semiconductor 154. In the case where the semiconductor 154 is the oxide semiconductor, the ohmic contacts 163 and 165 may be omitted.

A data conductor including a data line 171 including a source electrode 173 and an end portion 179, and a drain electrode 175, is formed on the ohmic contacts 163 and 165 and the gate insulating layer 140.

The data line 171 transfers a data signal and mainly extends in a vertical direction to cross the gate line 121.

The data line 171 may be periodically curved in order to improve transmittance. For example, as shown in FIG. 1, each data line 171 may be curved at a portion corresponding to a horizontal central line (not shown) of one pixel PX. In this case, an angle between most of the data lines 171 and the vertical direction may be approximately 5 to 7 degrees, but is not limited thereto. Further, the data line 171 may be further curved at least once around the horizontal center line, and in this case, an angle between the data line 171 around the horizontal center line and the vertical direction may be approximately 5 to 7 degrees, but is not limited thereto.

The data line 171 includes the source electrode 173. According to the exemplary embodiment illustrated in FIG. 1, the source electrode 173 is not protruded from the data line 171, and may be disposed on the same line as the data line 171.

The drain electrode 175 faces the source electrode 173. The drain electrode 175 may include a rod-shaped portion extending substantially parallel with the source electrode 173 and an extension which is opposite thereto.

The data conductor may be made of refractory metal such as molybdenum, chromium, tantalum, and titanium, or an alloy thereof, and may have a multilayered structure including a refractory metal layer (not illustrated) and a low resistive conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 may be made of various metals or conductors in addition to the metals.

The gate electrode 124, the source electrode 173, and the drain electrode 175 constitute one thin film transistor (TFT) together with the semiconductor 154, and a channel of the thin film transistor is positioned in the semiconductor 154 between the source electrode 173 and the drain electrode 175.

A first insulating layer 180*a* is disposed on the data conductor, the gate insulating layer 140, and an exposed portion of the semiconductor 154. The first insulating layer 180*a* may be made of, e.g., an inorganic insulating material.

A plurality of color filters 230*a* and 230*b* may be disposed on the first insulating layer 180*a*. The color filters 230*a* and 230*b* may uniquely display one of the primary colors, and examples of the primary colors may include three primary colors of red, green, and blue, and three primary colors of yellow, cyan, and magenta, or four primary colors. According to another exemplary embodiment of the present invention, the color filters 230*a* and 230*b* may further include a color filter displaying a mixed color of the primary colors or white in addition to the primary colors. Each of the color filters 230*a* and 230*b* may be longitudinally formed along a pixel column or a pixel row. The color filters 230*a* and 230*b* may include an organic material. In this case, the dielectric constant of the color filters 230*a* and 230*b* may have a low dielectric constant of less than about 4.

Referring to FIG. 2, the first color filter 230*a* and the second color filter 230*b* are respectively disposed at opposite sides of the data line 171 that generally extends in the vertical direction. Adjacent edges of the first and second color filters 230*a* and 230*b* are positioned to overlap the data line 171 thereabove. Accordingly, each of the first and second color filters 230*a* and 230*b* can be disposed to entirely cover the vicinity of the adjacent data line 171 in the horizontal direction.

In this case, the first color filter 230*a* and the second color filter 230*b* may be disposed above the data line 171 to partially overlap each other as shown in FIG. 3, or to not overlap each other as shown in FIG. 4. Whether or not the first and second color filters 230*a* and 230*b* overlap each other above the data line 171 depends on alignment errors according to scattering of the manufacturing process of the display device.

Referring to FIG. 2 to FIG. 4, a dummy color filter 230*cd* is disposed above one data line and below the common electrode 270. The dummy color filter 230*cd* may be disposed below or above the first and second color filters 230*a* and 230*b* which are disposed to overlap each other or to be adjacent to each other above the data line 171.

The dummy color filter 230*cd* displays a color different from those of the first and second color filters 230*a* and 230*b*. Among pixels PX of the display device according to the exemplary embodiment, the pixels that do not include the first and second color filters 230*a* and 230*b* may include a third color filter (not shown) that displays the same color as that of the dummy color filter 230*cd*. The third color filter can be disposed to entirely cover the vicinity of the adjacent data line 171 in the horizontal direction.

A thickness of the dummy color filter 230*cd* may be smaller than that of each of the first and second color filters 230*a* and 230*b*. Specifically, the thickness of the dummy color filter 230*cd* may be smaller than about half of the thickness of each of the first and second color filters 230*a* and 230*b*. The dummy color filter 230*cd* may also include an organic material. In this case, the dielectric constant of the dummy color filter 230*cd* may have a low dielectric constant of less than about 4.

Opposite edges of the dummy color filter 230*cd* may be disposed within an area of the data line 171 which is disposed therebelow. Specifically, the opposite edges of dummy color filter 230*cd* may be disposed between opposite edges of the data line 171 which is disposed therebelow.

A second insulating layer 180*b* is disposed on the first and second color filters 230*a* and 230*b* and the dummy color filter 230*cd*. The second insulating layer 180*b* may include an inorganic insulating material. The second insulating layer 180*b* may serve as an overcoat of the color filters 230*a* and 230*b*, to prevent the first and second color filters 230*a* and 230*b* from being exposed and provide a flat surface. The second insulating layer 180*b* may also serve to prevent impurities such as pigments of the first and second color filters 230*a* and 230*b* from flowing into the liquid crystal layer 3.

A common electrode 270 may be disposed on the second insulating layer 180*b*. The common electrode 270 may have a planar shape, and may be formed as a plate on the entire substrate 110. The common electrodes 270 disposed at adjacent pixels PX are connected to each other to transfer a common voltage Vcom having a predetermined magnitude. The common electrode 270 may be made of a transparent conductive material such as indium tin oxide (ITO) or indium zinc oxide (IZO).

The common electrode 270 may have an opening 273 formed in a region corresponding to a portion of the drain electrode 175.

A third insulating layer 180*c* may be disposed on the common electrode 270. In this case, the third insulating layer 180*c* may be made of an inorganic insulating material.

The first insulating layer 180*a*, the second insulating layer 180*b*, and the third insulating layer 180*c* include a contact hole 185*a* for exposing the drain electrode 175 and a contact hole 187 for exposing the end portion 179 of the data line 171. The contact hole 185*a* may be disposed in the opening 273 of the common electrode 270. In other words, the opening 273 of the common electrode 270 may surround the contact hole 185*a*.

The first insulating layer 180*a*, second insulating layer 180*b*, third insulating layer 180*c*, and gate insulating layer 140 may include a contact hole 182 for exposing the end portion 129 of the gate line 121.

A pixel electrode 191 and contact assistants 82 and 87 may be disposed on the third insulating layer 180*c*.

The pixel electrode 191 may include a plurality of branch electrodes 192 that are disposed to overlap the common electrode 270. A slit 92 where the electrodes are removed is formed between adjacent branch electrodes 192. The branch electrodes 192 of the pixel electrode 191 may be disposed to extend substantially parallel with the data line 171. The pixel electrode 191 may be physically and electrically connected to the drain electrode 175 through the contact hole 185*a* to receive a voltage from the drain electrode 175.

The contact assistant 82 is connected to the end portion 129 of the gate line 121 through the contact hole 182. The contact assistant 87 is connected to the end portion 179 of the data line 171 through the contact hole 187.

The pixel electrode 191 and the contact assistants 82 and 87 may be made of a transparent conductive material such as ITO or IZO.

According to another exemplary embodiment, stacking positions of the pixel electrode 191 and the common electrode 270 may be exchanged. In other words, the pixel electrode 191 may be disposed on the second insulating layer 180b, the third insulating layer 180c may be disposed thereon, and the common electrode 270 may be disposed thereon. In this case, no contact hole 185a may be formed in the third insulating layer 180c, and the common electrode 270 may not have the opening 273. Further, the pixel electrode 191 may have a planer shape which fills most of the area of the pixel PX, and the common electrode 270 may include a plurality of branch electrodes (not illustrated) that are disposed to overlap the pixel electrode 191.

An alignment layer 11 may be coated on the pixel electrode 191. The alignment layer 11 may be a horizontal alignment layer. The alignment layer 11 may be rubbed in a predetermined direction. However, according to another exemplary embodiment, the alignment layer 11 may be photo-aligned by including a photo-reactive material.

A light blocking member 220 may be disposed on the pixel electrode 191. The light blocking member 220 may be referred to as a black matrix and may prevent light leakage between the pixels PX. The light blocking member 220 may include a pigment such as carbon black and a photosensitive organic material.

In FIG. 2, it is illustrated that the light blocking member 220 is disposed on the alignment layer 11, but the present invention is not limited thereto. For example, the alignment layer 11 may be coated on the light blocking member 220 and the pixel electrode 191.

The light blocking member 220 may include a spacer 221 and a main light blocker 222.

The spacer 221 may serve to maintain a separated distance between the lower panel 100 and the upper panel 200.

The main light blocker 222 has a thickness that is smaller than that of the spacer 221. The main light blocker 222 may include a first light blocker 222a disposed to cover the gate line 121 and to extend substantially parallel with the gate line 121, and a second light blocker 222b disposed to cover the data line 171 and to extend substantially parallel with the data line 171. The first light blocker 222a may include a first portion for covering the thin film transistor and a second portion for covering the contact hole 185a for exposing the drain electrode 175. In the case that the data line 171 serves as a light blocking member, the second light blocker 222b may be omitted.

The liquid crystal layer 3 includes liquid crystal molecules (not illustrated) having dielectric anisotropy. The liquid crystal molecules may be aligned such that long axes thereof are parallel with the display panels 100 and 200 in a state in which no electric field is generated in the liquid crystal layer 3. In this case, the liquid crystal molecules may have positive dielectric anisotropy. The liquid crystal molecules may be nematic liquid crystal molecules having a structure in which the long-axial directions thereof are spirally twisted from the lower panel 100 to the upper panel 200. According to another exemplary embodiment, the liquid crystal molecules may be aligned such that long axes thereof are perpendicular to the display panels 100 and 200 in a state in which no electric field is generated in the liquid crystal layer 3. In this case, the liquid crystal molecules may have negative dielectric anisotropy. In this case, the disposition and structure of the pixel electrode 191 and the common electrode 270 may be modified, unlike those illustrated in FIG. 1 and FIG. 2.

The pixel electrode 191 may receive a data voltage through the thin film transistor, and the common electrode 270 may receive a common voltage Vcom. Then, the liquid crystal molecules of the liquid crystal layer 3 disposed between the pixel electrode 191 and the common electrode 270 are rearranged by an electric field generated in the liquid crystal layer 3 by the pixel electrode 191 and the common electrode 270 as the field generating electrodes. The polarization of light passing through the liquid crystal layer 3 is adjusted by the rearranged liquid crystal molecules, thereby accomplishing images having a desired luminance. According to the exemplary embodiment illustrated in FIG. 1 and FIG. 2, branch electrodes 192 of the pixel electrode 191 can generate a fringe field in the liquid crystal layer 3 together with the common electrode 270, to determine alignment directions of the liquid crystal molecules. Accordingly, as in the exemplary embodiment, when the branch electrodes 192 included in one pixel electrode 191 have different directional slopes, directions in which the liquid crystal molecules are inclined are varied, thereby improving a standard viewing angle.

Further, as in the exemplary embodiment, the light blocking member 220, the color filters 230a and 230b, the pixel electrode 191, and the thin film transistor can be easily aligned by disposing the first and second color filters 230a and 230b and the light blocking member 220 in the lower panel 100 together with the thin film transistor, thereby reducing alignment errors caused by scattering in the process. As a result, it is possible to prevent transmittance deterioration or light leakage of the liquid crystal display caused by misalignment between the constituent elements, thereby improving the transmittance.

Referring to FIG. 3, when the first color filter 230a and the second color filter 230b are disposed to overlap each other above the data line 171, the overlapped portions of the first and second color filters 230a and 230b are positioned between the data line 171 and the common electrode 270, thereby reducing parasitic capacitance between the data line 171 and the common electrode 270. This can prevent fluctuation of the common voltage Vcom of the common electrode 270 caused by coupling with data signals transferred through the data line 171. Particularly, in the case that polarity of data signals is inverted every at least one frame or is row-inverted in one frame, if a level of the common voltage Vcom of the common electrode 270 is changed according to the inversion of the data signals, it is difficult to display normal luminance by each pixel PX, and thus display errors such as spots may be generated. However, according to the present exemplary embodiment, since the parasitic capacitance between the data line 171 and the common electrode 270 is reduced, it is possible to prevent generation of display errors such as spots caused by coupling between the data line 171 and the common electrode 270.

Particularly, as shown in FIG. 4, an alignment error generated by scattering in the process causes the first and second color filters 230a and 230b, which overlap each other above the data line 171, to be separated from each other, or causes the overlapped portions of the first and second color filters 230a and 230b to be reduced, thereby increasing the parasitic capacitance between the data line 171 and the common electrode 270. However, according to the exemplary embodiment, the first and second color filters 230a and 230b overlap each other above the dummy color filter 230cd, which is disposed below the common electrode 270 and above the data line 171. Accordingly, it is possible to reduce the parasitic capacitance between the data line 171 and the common electrode 270 even though edges of the first and second color filters 230a and 230b are separated from each other, or the first and second color filters 230a and 230b have insufficient overlapped areas. Accordingly, it is possible to prevent the fluctuation of the common voltage Vcom caused by the coupling between the data line 171 and the common electrode 270.

Further, this can reduce the crosstalk between the data line 171 and the adjacent pixel electrode 191, thereby decreasing the light leakage generated by distortion of the electric field. As a result, the width of the data line 171 in which the dummy color filter 230cd is disposed can be further reduced.

In addition, according to the exemplary embodiment, it is not necessary to interpose an organic film including an organic material between the data line 171 and the common electrode 270, unlike the conventional art, thereby reducing a cost of the material of the organic film. Further, it is not required to add a mask and a process for forming the organic film, thereby reducing the manufacturing cost and simplifying the manufacturing process. In addition, there is no probability of reducing transmittance caused by the organic film, and it is possible to prevent the contamination of the liquid crystal layer 3 caused by the organic material of the organic film.

Hereinafter, a display device according to an exemplary embodiment will be described with reference to FIG. 5 and FIG. 6 in addition to the aforementioned drawings.

Figure 5:
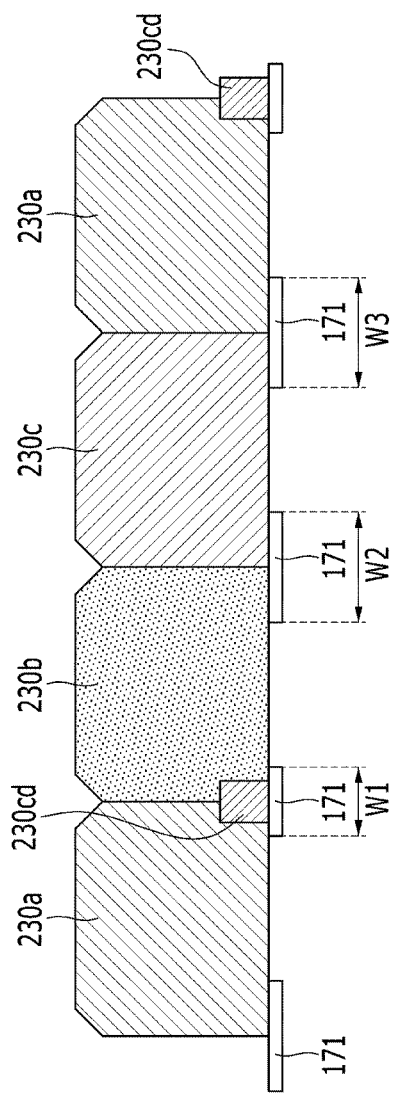
FIG. 5 is a schematic cross-sectional view illustrating four adjacent pixels in a display device according to an exemplary embodiment.

FIG. 5 is a schematic cross-sectional view illustrating four adjacent pixels in a display device according to an exemplary embodiment. FIG. 6 is a cross-sectional view illustrating a boundary between two adjacent pixels and its vicinity in a display device according to an exemplary embodiment.

Referring to FIG. 5, the display device according to the exemplary embodiment includes a plurality of data lines 171, a plurality of color filters 230a, 230b, and 230c disposed above the data line 171, and a dummy color filter 230cd. The first color filter 230a, the second color filter 230b, and the third color filter 230c may display different colors, e.g., red, green, and blue, respectively. However, the colors may be exchanged or different colors may be displayed without being limited thereto. Further, the specific kinds of color filters are exemplary, and not meant to serve as limitations. This is true of a display device including four or more kinds of color filters.

As described above, the dummy color filter 230cd may be disposed above the data line 171, between the adjacent first and second color filters 230a and 230b and the data line 171, or on the first and second color filters 230a and 230b. In the present exemplary embodiment, it is illustrated that the dummy color filter 230cd is disposed between the first and second color filters 230a and 230b and above the data line 171. The dummy color filter 230cd may include a pigment that displays substantially the same color as that of the third color filter 230c.

No dummy color filter may be formed on the data lines 171 between the second and third color filters 230b and 230c and/or between third and first color filter 230c and 230a. In this case, a second width W2 of the data line 171 positioned between the second and third color filters 230b and 230c and/or a third width W3 of the data line 171 positioned between the third and first color filters 230c and 230a may be larger than a first width W1 of the data line 171 which is disposed to overlap the dummy color filter 230cd.

Figure 6:
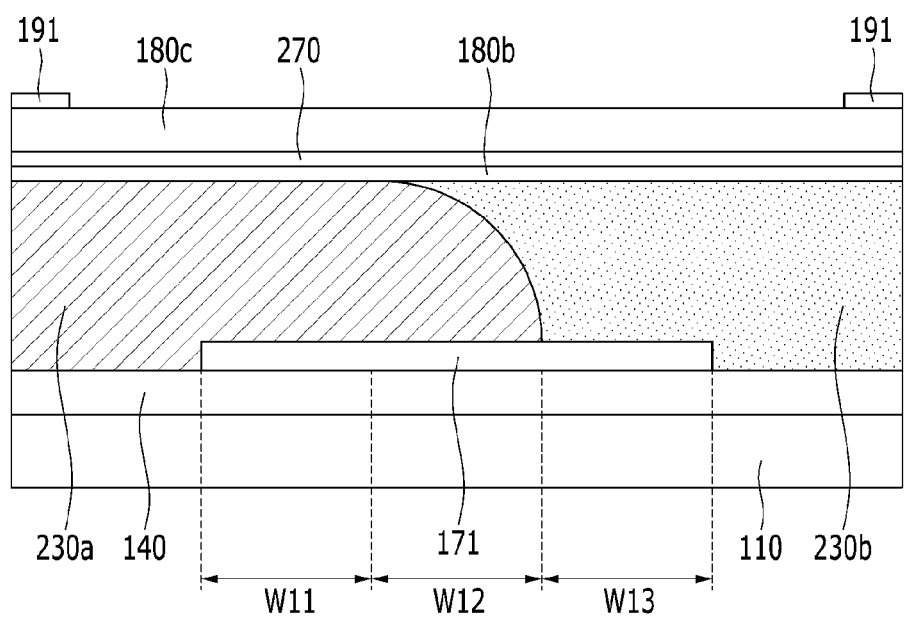
FIG. 6 is a cross-sectional view illustrating a boundary between two adjacent pixels and its vicinity in a display device according to an exemplary.

Referring to FIG. 6, both the first color filter 230a and the second color filter 230b are required to overlap the data line 171 above a portion of the data line 171 above which no dummy color filter is disposed. Accordingly, it is necessary to provide a minimum margin of partial widths W11 and W13. Further, the first and second color filters 230a and 230b are required to overlap each other above the data line 171 to reduce parasitic capacitance between the data line 171 and the common electrode 270, and thus it is necessary to provide a minimum margin of a partial width W12 for the overlapping of the first and second color filters 230a and 230b. Accordingly, as in the exemplary embodiment, the widths W2 and W3 of the data line 171 above which no dummy color filter is disposed may be larger than the width W1 of the data line 171 above which the dummy color filter 230cd is disposed.

In addition, since parasitic capacitance between the data line 171 above which no dummy color filter is disposed and the adjacent pixels PX becomes relatively large, the widths W2 and width W3 are required to be widened to block light leakage between the pixels PX.

However, in the case of the data line 171 above which the dummy color filter 230cd is disposed, the dummy color filter 230cd can reduce parasitic capacitance between the data line 171 and the common electrode 270 or the pixel electrode 191 of the adjacent pixels PX, and thus a margin for the partial width W12 illustrated in FIG. 6 can be omitted. Accordingly, it is possible to further reduce the width W1 of the data line 171. Further, since the parasitic capacitance between the data line 171 and the adjacent pixels PX can be reduced by the action of the dummy color filter 230cd, the width W1 of the data line 171 can be reduced by as much as the parasitic capacitance is reduced. Accordingly, it is possible to improve the aperture ratio and transmittance of the pixels PX and to easily design the display device with high resolution.

Various other characteristics of the display device according to the aforementioned exemplary embodiment of FIG. 1 to FIG. 4 may be applied to the display device according to the exemplary embodiment of FIG. 5 and FIG. 6 as they are, and thus detailed descriptions of constituent elements illustrated therein will be omitted.

Hereinafter, a manufacturing method of a display device according to an exemplary embodiment will be described with reference to FIG. 7 through FIG. 9, in addition to the aforementioned drawings.

Figure 7:
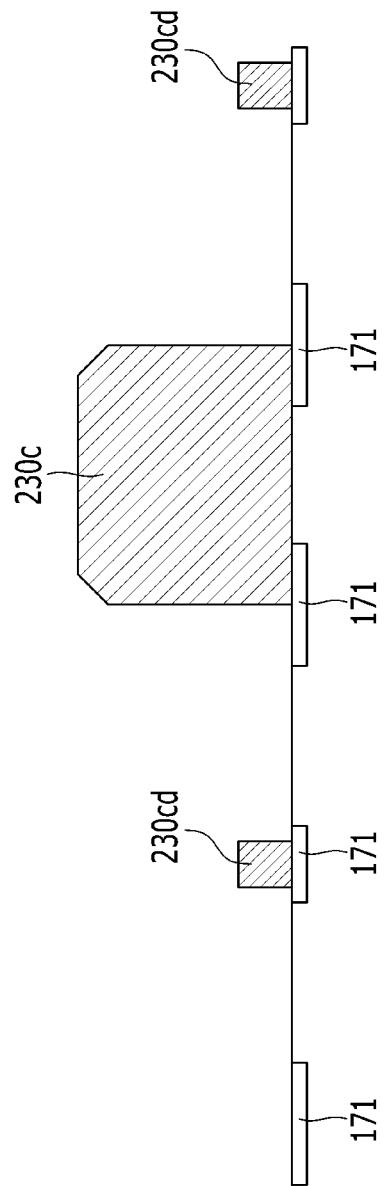
FIG. 7 is a schematic cross-sectional view illustrating four adjacent pixels of an intermediate product of a display device in a step in a process of a manufacturing method of the display device according to an exemplary embodiment.
Figure 8:
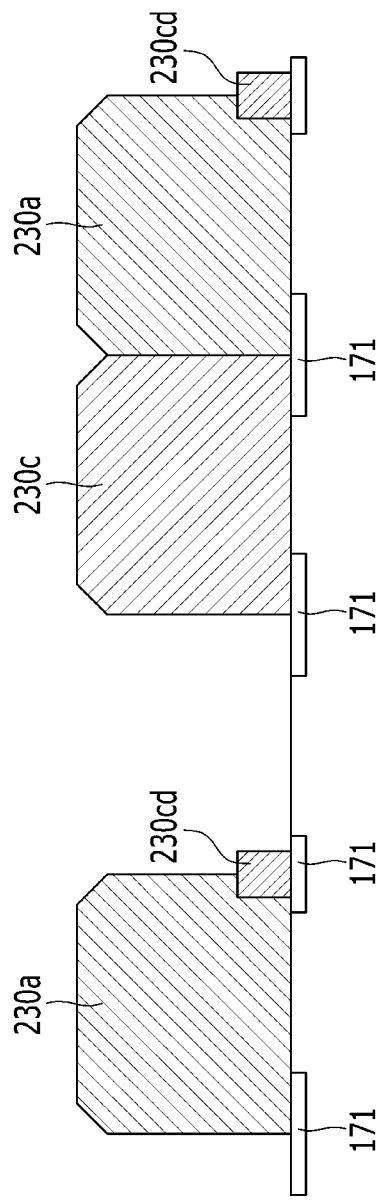
FIG. 8 is a schematic cross-sectional view illustrating four adjacent pixels of an intermediate product of a display device in a step next to the step illustrated in FIG. 7 in the process of the manufacturing method of the display device according to the exemplary embodiment.
Figure 9:
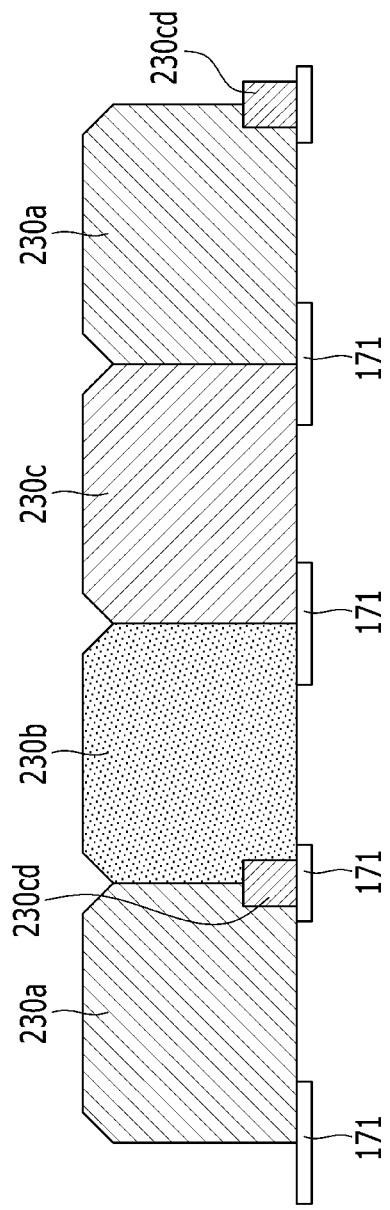
FIG. 9 is a schematic cross-sectional view illustrating four adjacent pixels of an intermediate product of a display device at a step next the step illustrated FIG. 8 in the process of the manufacturing method of the display device according to the exemplary embodiment.

FIG. 7 is a schematic cross-sectional view illustrating four adjacent pixels of an intermediate product of a display device in a step in a process of a manufacturing method of the display device according to an exemplary embodiment, FIG. 8 is a schematic cross-sectional view illustrating four adjacent pixels of an intermediate product of a display device in a step next to the step illustrated FIG. 7 in the process of the manufacturing method of the display device according to the exemplary embodiment, and FIG. 9 is a schematic cross-sectional view illustrating four adjacent pixels of an intermediate product of a display device in a step next to the step illustrated FIG. 8 in the process of the manufacturing method of the display device according to the exemplary embodiment.

Referring to FIG. 7 together with FIG. 1 and FIG. 2, the gate conductor including the gate line 121, the gate insulating layer 140, and the semiconductor 154 are formed on the substrate 110, and then a conductive material such as a metal is stacked thereon and patterned to form the data conductor including the data lines 171 and the drain electrodes 175. As described above, widths between two adjacent data lines 171 may be substantially the same, or a first width between a first pair of adjacent data lines 171 may be smaller than a second width between a second pair of adjacent data lines 171 that are adjacent thereto.

Next, a third color filter material is coated on the data lines 171 and is patterned by using, e.g., a photolithography process to form a plurality of third color filters 230c and dummy color filters 230cd. The dummy color filters 230cd may be disposed above the data lines 171 of which the widths are relatively small. The third color filter 230c may be formed at a pixel PX disposed between two data lines 171. The third color filters 230c and the dummy color filters 230cd are separated from each other, and are disposed on different data lines 171.

The thickness of the dummy color filters 230cd is formed to be smaller than that of the third color filters 230c, and a photomask used for the photolithography process may include transparent regions positioned to correspond to areas at which the third color filters 230c are to be formed, and halftone regions or slits positioned to correspond to areas at which the dummy color filters 230cd are to be formed. The photomask may include opaque regions for areas at which the third color filter material needs to be removed. In this case, a portion of the third color filter material remaining after light irradiation may have negative photosensitivity. In contrast, when the third color filter material has positive photosensitivity, the transparency of the aforementioned photomask may be reversed.

Next, referring to FIG. 8, a first color filter material for displaying a color different from that of the third color filters 230c is coated and is patterned by using, e.g., the photolithography process to form a plurality of first color filters 230a disposed at pixels PX, each of which is disposed between the adjacent data lines 171. Edges of the first color filters 230a may be formed to at least partially overlap the dummy color filters 230cd.

Next, referring to FIG. 9, a second color filter material for displaying a color different from those of the first and third color filters 230a and 230c is coated and is patterned by using, e.g., the photolithography process to form a plurality of second color filters 230b disposed at pixels PX each of which is disposed between the adjacent data lines 171. Edges of the second color filters 230b may be formed to at least partially overlap the dummy color filters 230cd, or to not overlap the dummy color filters 230cd.

Hereinafter, a display device according to an exemplary embodiment will be described with reference to FIG. 10 in addition to FIG. 1 to FIG. 5 which are described above.

Figure 10:
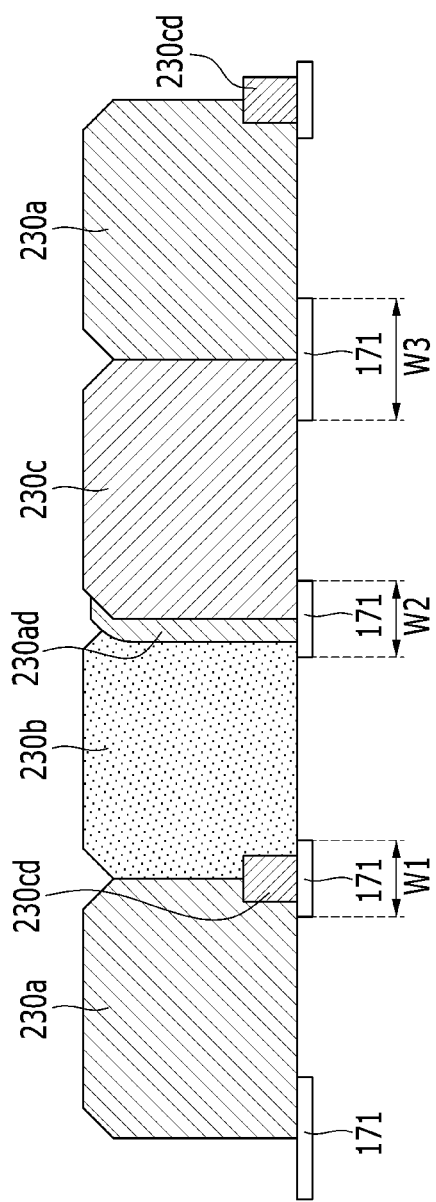
FIG. 10 is a schematic cross-sectional view illustrating four adjacent pixels in a display device according to an exemplary embodiment.

FIG. 10 is a schematic cross-sectional view illustrating four adjacent pixels in a display device according to an exemplary embodiment.

Referring to FIG. 10, the display device of the present exemplary embodiment is mostly the same as the display device described with reference to FIG. 5, but may further include a dummy color filter 230ad.

The dummy color filter 230ad may be disposed above the data line 171 above which no dummy color filter 230cd is disposed, for example, above the data line 171 between the second color filter 230b and the third color filter 230c, and below the common electrode 270.

The dummy color filter 230ad may be disposed above the third color filter 230c and below the second color filter 230b. When the second and third color filters 230b and 230c are separated from each other, the dummy color filter 230ad may include a region that is disposed between the second and third color filters 230b and 230c.

The dummy color filter 230ad displays a color different from those of the second and third color filters 230b and 230c. For example, the dummy color filter 230ad may display the same color as that of the first color filter 230a. The thickness of the dummy color filter 230ad may be smaller than that of each of the first to third color filters 230a, 230b, and 230c. For example, the thickness of the dummy color filter 230ad may be smaller than about half of the thickness of each of the first to third color filters 230a, 230b, and 230c. The dummy color filter 230ad may also include an organic material. In this case, the dielectric constant of the dummy color filter 230ad may have a low dielectric constant of less than about 4.

Opposite edges of the dummy color filter 230ad may be disposed within an area of the data line 171 which is disposed therebelow. Specifically, the opposite edges of dummy color filter 230ad may be disposed between opposite edges of the data line 171 which is disposed therebelow.

As described above, an alignment error generated by scattering in the process causes the second and third color filters 230b and 230c, which are overlapped with each other above the data line 171, to be separated from each other, or causes the overlapped portions of the second and third color filter 230b and 230c to be reduced, thereby increasing the parasitic capacitance between the data line 171 and the common electrode 270. However, according to the exemplary embodiment, the second and third color filters 230b and 230c are overlapped with each other above the dummy color filter 230ad, which is disposed below the common electrode 270 and above the data line 171. Accordingly, it is possible to reduce the parasitic capacitance between the data line 171 and the common electrode 270 even though edges of the second and third color filter 230b and 230c are separated from each other, or the second and third color filters 230b and 230c have insufficient overlapped areas. Accordingly, it is possible to prevent the fluctuation of the common voltage Vcom caused by the coupling between the data line 171 and the common electrode 270.

Further, this can reduce the crosstalk between the data line 171 and the adjacent pixel electrode 191, thereby decreasing the light leakage generated by distortion of the electric field. As a result, the width of the data line 171 in which the dummy color filter 230ad is disposed can be further reduced.

The width W3 of the data line 171 above which no dummy color filter 230cd or 230ad is formed may be larger than the width W1 or W2 of the data line 171 which is disposed to overlap the dummy color filter 230cd or 230ad.

The first and third color filters 230a and 230c are required to overlap each other above the data line 171 to reduce parasitic capacitance between the data line 171 and the common electrode 270, and thus it is necessary to provide a minimum margin area for the overlapping of the first and third color filters 230a and 230c. Accordingly, width W3 of the data line 171 above which no dummy color filter 230cd or 230ad is formed may be larger than the width W1 or W2 of the data line 171 above which the dummy color filter 230cd or 230ad is disposed.

However, in the case of the data line 171 above which the dummy color filter 230ad is disposed, the dummy color filter 230ad can reduce parasitic capacitance between the data line 171 and the common electrode 270 or the pixel electrode 191 of the adjacent pixels PX, and thus it is possible to further reduce the width W2 of the data line 171. Further, since the parasitic capacitance between the data line 171 and the adjacent pixels PX can be reduced by the action of the dummy color filter 230ad, the width W2 of the data line 171 can be reduced by as much as the parasitic capacitance is reduced. Accordingly, it is possible to improve the aperture ratio and transmittance of the pixels PX and to easily design the display device of high resolution.

Various other characteristics and effects of the display device according to the aforementioned exemplary embodiment may be equally applied to the display device according to the present exemplary embodiment.

According to another exemplary embodiment, the dummy color filter 230cd of illustrated in FIG. 10 may be omitted.

Hereinafter, a manufacturing method of a display device according to an exemplary embodiment will be described with reference to FIG. 11 to FIG. 13 in addition to the aforementioned drawings.

Figure 11:
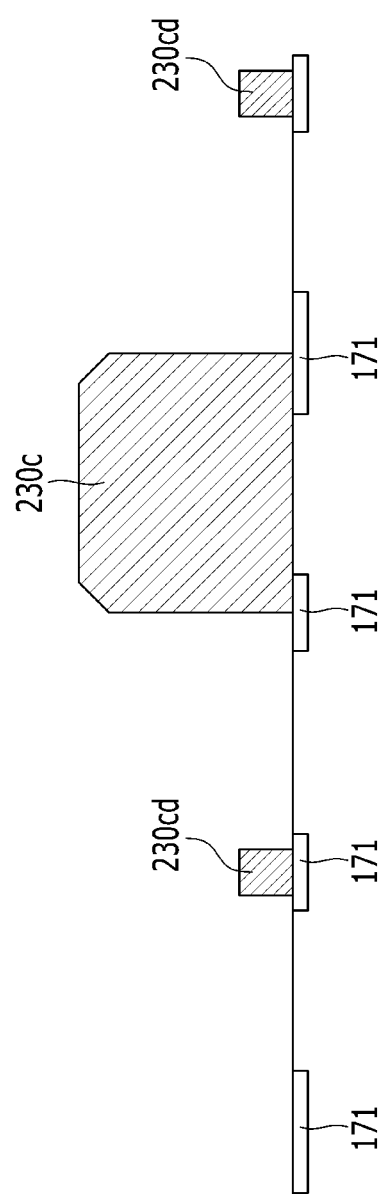
FIG. 11 is a schematic cross-sectional view illustrating four adjacent pixels of an intermediate product of a display device in a step in a process of a manufacturing method of the display device according to an exemplary embodiment.
Figure 12:
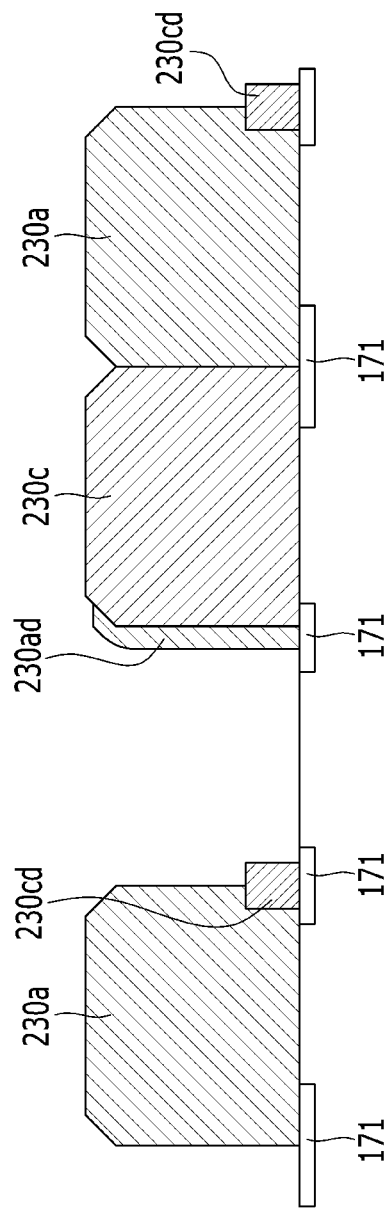
FIG. 12 is a schematic cross-sectional view illustrating four adjacent pixels of an intermediate product of a display device in a step next to the step illustrated FIG. 11 in the process of the manufacturing method of the display device according to the exemplary embodiment.
Figure 13:
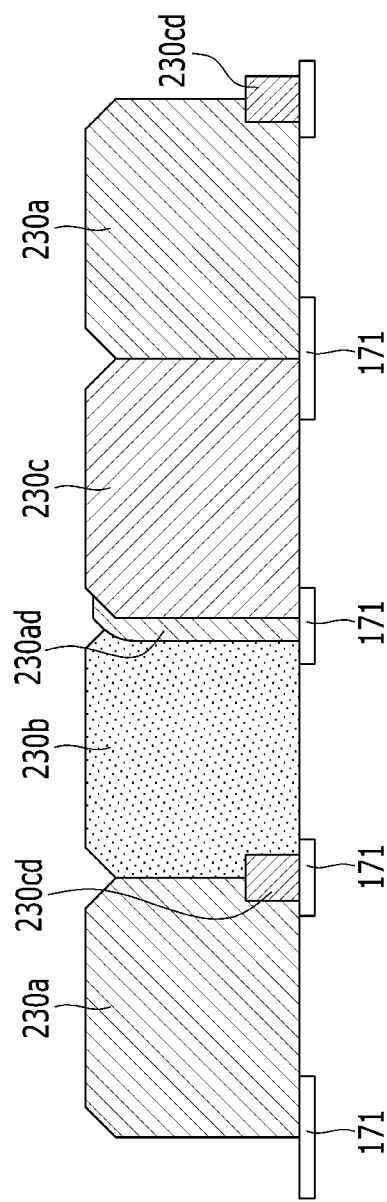
FIG. 13 is a schematic cross-sectional view illustrating four adjacent pixels of an intermediate product of a display device in a step next to the step illustrated FIG. 12 in the process of the manufacturing method of the display device according to the exemplary embodiment.

FIG. 11 is a schematic cross-sectional view illustrating four adjacent pixels of an intermediate product of a display device in a step in a process of a manufacturing method of the display device according to an exemplary embodiment, FIG. 12 is a schematic cross-sectional view illustrating four adjacent pixels of an intermediate product of a display device in a step next to the step illustrated FIG. 11 in the process of the manufacturing method of the display device according to the exemplary embodiment, and FIG. 13 is a schematic cross-sectional view illustrating four adjacent pixels of an intermediate product of a display device in a step next to the step illustrated FIG. 12 in the process of the manufacturing method of the display device according to the exemplary embodiment.

A manufacturing method of the display device according to an exemplary embodiment is mostly the same as the manufacturing method of the display device according to the exemplary embodiment illustrated in FIG. 7 to FIG. 9 which are described above, and thus it will be described based on the differences therebetween.

Referring to FIG. 11, a conductive material such as a metal is stacked on the substrate 110 and patterned to form the data conductor including the data lines 171 and the drain electrodes 175. Widths between two adjacent data lines 171 may be substantially the same, or a first width between a first pair of adjacent data lines 171 may be larger than a second width between a second pair of adjacent data lines 171 that are adjacent thereto.

Next, a third color filter material is coated on the data lines 171 and is patterned by using, e.g., a photolithography process to form a plurality of third color filters 230c and dummy color filters 230cd. The dummy color filters 230cd may be disposed above the data lines 171 of which the widths are relatively small. The third color filter 230c may be formed at a pixel PX disposed between two data lines 171. The third color filters 230c and the dummy color filters 230cd are separated from each other, and are disposed on different data lines 171.

The thickness of the dummy color filters 230cd is formed to be smaller than that of the third color filters 230c, and a photomask used for the photolithography process may include transparent regions positioned to correspond to areas at which the third color filters 230c are to be formed, and halftone regions or slits positioned to correspond to areas at which the dummy color filters 230cd are to be formed. The photomask may include opaque regions for areas at which the third color filter material needs to be removed.

Next, referring to FIG. 12, a first color filter material for displaying a color different from that of the third color filters 230c is coated and is patterned by using, e.g., the photolithography process to form a plurality of first color filters 230a and dummy color filters 230ad disposed at pixels PX each of which is disposed between the adjacent data lines 171. Edges of the first color filters 230a may be formed to at least partially overlap the dummy color filters 230cd. The dummy color filters 230ad may be formed to overlap the edges of the third color filters 230c, or may be formed to not overlap the edges of the third color filters 230c.

The thickness of the dummy color filter 230ad is formed to be smaller than that of the first color filter 230a, and a photomask used for the photolithography process may include transparent regions positioned to correspond to areas at which the first color filter 230a are to be formed, and halftone regions or slits positioned to correspond to areas at which the dummy color filter 230ad are to be formed. The photomask may include opaque regions for areas at which the first color filter material needs to be removed.

Next, referring to FIG. 13, a second color filter material for displaying a color different from those of the first and third color filters 230a and 230c is coated and is patterned by using, e.g., the photolithography process to form a plurality of second color filters 230b disposed at pixels PX each of which is disposed between the adjacent data lines 171. One edge of the second color filter 230b may be formed to at least partially overlap the dummy color filters 230cd, and another edge thereof may be formed to at least partially overlap the dummy color filters 230ad, or to not overlap the dummy color filters 230ad.

Hereinafter, a display device according to an exemplary embodiment of the present invention will be described with reference to FIG. 14 in addition to FIG. 1 to FIG. 5 which are described above.

Figure 14:
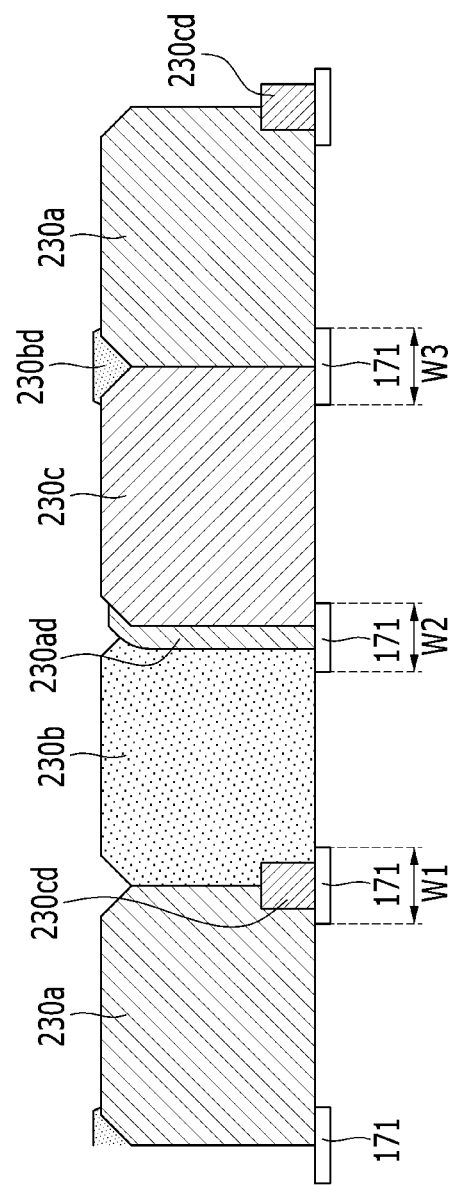
FIG. 14 is a schematic cross-sectional view illustrating four adjacent pixels in a display device according to an exemplary embodiment.

FIG. 14 is a schematic cross-sectional view illustrating four adjacent pixels in a display device according to an exemplary embodiment of the present invention.

Referring to FIG. 14 the display device of the present exemplary embodiment is mostly the same as the display device described with reference to FIG. 10, but may further include a dummy color filter 230bd.

The dummy color filter 230bd may be disposed above the data line 171 above which the dummy color filters 230cd and 230ad are not disposed, for example, above the data line 171 between the third color filter 230c and the first color filter 230a, and below the common electrode 270.

The dummy color filter 230bd may be disposed above the third color filter 230c and above the first color filter 230a. When the third and first color filters 230c and 230a are separated from each other, the dummy color filter 230bd may include a region that is disposed between the third and first color filters 230c and 230a.

The dummy color filter 230bd displays a color different from those of the third and first color filters 230c and 230a. For example, the dummy color filter 230bd may display the same color as that of the second color filter 230b. The thickness of the dummy color filter 230bd may be smaller than that of each of the first to third color filters 230a, 230b, and 230c. For example, the thickness of the dummy color filter 230bd may be smaller than about half of the thickness of each of the first to third color filters 230a, 230b, and 230c. The dummy color filter 230bd may also include an organic material. In this case, the dielectric constant of the dummy color filter 230bd may have a low dielectric constant of less than about 4.

Opposite edges of the dummy color filter 230bd may be disposed within an area of the data line 171 which is disposed therebelow. Specifically, the opposite edges of the dummy color filter 230bd may be disposed between opposite edges of the data line 171 which is disposed therebelow.

As described above, an alignment error generated by scattering in the process causes the third and first color filters 230c and 230a which are overlapped with each other above the data line 171 to be separated from each other, or causes the overlapped portions of the third and first color filters 230*c* and 230*a* to be reduced, thereby increasing the parasitic capacitance between the data line 171 and the common electrode 270. However, according to the exemplary embodiment of the present invention, the dummy color filter 230*bd* is disposed below the common electrode 270 and above the data line 171 above which the third and first color filters 230*c* and 230*a* are overlapped with each other. Accordingly, it is possible to reduce the parasitic capacitance between the data line 171 and the common electrode 270 even though edges of the third and first color filters 230*c* and 230*a* are separated from each other, or the third and first color filters 230*c* and 230*a* have insufficient overlapped areas. Accordingly, it is possible to prevent the fluctuation of the common voltage Vcom caused by the coupling between the data line 171 and the common electrode 270.

Further, this can reduce the crosstalk between the data line 171 and the adjacent pixel electrode 191, thereby decreasing the light leakage generated by distortion of the electric field. As a result, the width of the data line 171 in which the dummy color filter 230*bd* is disposed can be further reduced.

According to the present exemplary embodiment, since the dummy color filters 230*cd*, 230*ad*, and 230*bd* are disposed above all the data lines 171, all the widths W1, W2, and W3 of the data lines 171 can be reduced. To reduce parasitic capacitance between the data line 171 and the common electrode 270 above the data line 171, the dummy color filters 230*cd*, 230*ad*, and 230*bd* are disposed between the data lines 171 and the common electrode 270, and thus margins for reducing the widths W1, W2, and W3 of the data lines 171 can be accomplished even though the adjacent color filters 230*a*, 230*b*, and 230*c* do not overlap each other above the data lines 171. Further, since the parasitic capacitance between the data lines 171 and the adjacent pixels PX can be reduced by the action of the dummy color filters 230*ad*, 230*ad*, and 230*bd*, the widths W1, W2, and W3 of the data lines 171 can be reduced by as much as the parasitic capacitance is reduced. Accordingly, it is possible to improve the aperture ratio and transmittance of the pixels PX and to easily design the display device with high resolution.

All the widths W1, W2, and W3 of the data lines 171 may be substantially the same.

Various other characteristics and effects of the display device according to the aforementioned exemplary embodiment may be equally applied to the display device according to the present exemplary embodiment.

A manufacturing method of the display device according to the exemplary embodiment illustrated in FIG. 14 is mostly the same as the manufacturing method of the display device according to the exemplary embodiment illustrated in FIG. 11 to FIG. 13 which are described above, but the dummy color filter 230*bd* is formed above the data line 171 between the third color filter 230*c* and the first color filter 230*a* together with the second color filter 230*b* when the second color filter 230*b* is formed after the first and third color filters 230*a* and 230*c* are formed.

In this case, the thickness of the dummy color filter 230*bd* is formed to be smaller than that of the second color filter 230*b*, and a photomask used for the photolithography process may include transparent regions positioned to correspond to areas at which the second color filters 230*b* are to be formed, and halftone regions or slits positioned to correspond to areas at which the dummy color filters 230*bd* are to be formed. The photomask may include opaque regions for areas at which the second color filter material needs to be removed.

According to another exemplary embodiment of the present invention, at least one of the dummy color filters 230*cd* and 230*ad* of the exemplary embodiment illustrated in FIG. 14 may be omitted.

According to exemplary embodiments described above, it is possible to provide a display device and a manufacturing method thereof, capable of preventing light leakage and display errors caused by parasitic capacitance between field generating electrodes and data lines without using an organic film, and accomplishing a low manufacturing cost of the display device and a simplified manufacturing process.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
    a substrate;
    a plurality of data lines disposed on the substrate;
    a first color filter comprising a first material disposed between a first data line and a second data line that are adjacent to each other among the plurality of data lines;
    a first dummy color filter comprising the first material, disposed over a third data line that is adjacent to the first data line among the plurality of data lines, and separated from the first color filter; and
    a second color filter comprising a second material that is different from the first material and disposed at a region between the first data line and the third data line;
    a third color filter comprising a third material that is different from the first and second materials, disposed on the first dummy color filter, and disposed at a region between the third data line and a fourth data line among the plurality of data lines, wherein the fourth data line is adjacent to the third data line; and
    a second dummy color filter comprising the third material, disposed over the first data line, and separated from the third color filter,
    wherein a surface of the second color filter facing the substrate is disposed on the second dummy color filter,
    wherein a thickness of the first dummy color filter is smaller than that of the first color filter,
    wherein the second color filter is disposed on the first dummy color filter, and
    wherein a width of the first data line and/or the third data line is smaller than a width of the second data line.

2. The display device of claim 1, wherein an edge of the second color filter and an edge of the third color filter overlap the third data line.

3. The display device of claim 2, wherein an edge of the first dummy color filter overlaps the third data line.

4. The display device of claim 3, wherein a thickness of the first dummy color filter is smaller than half of a thickness of the first color filter.

5. The display device of claim 4, wherein a width of the third data line is smaller than a width of the first data line and/or the second data line.

6. The display device of claim 1, wherein edges of the first color filter and the second color filter overlap the first data line.

7. The display device of claim 6, wherein a thickness of the second dummy color filter is smaller than half of a thickness of the third color filter.

8. The display device of claim 1, further comprising
a third dummy color filter comprising the second material, disposed over the second data line, and separated from the second color filter.

9. The display device of claim 8, wherein the third dummy color filter is disposed on the first color filter.

10. The display device of claim 9, wherein an edge of the first color filter overlaps the second data line.

11. The display device of claim 10, wherein a thickness of the third dummy color filter is smaller than half of a thickness of the second color filter.

12. The display device of claim 1,
wherein a surface of the first dummy color filter facing the substrate is disposed on the third color filter.

13. The display device of claim 12, wherein edges of the second color filter and the third color filter overlap the third data line.

14. The display device of claim 13, wherein an edge of the first dummy color filter overlaps the third data line.

15. The display device of claim 14, wherein a thickness of the first dummy color filter is smaller than half of a thickness of the first color filter.

16. The display device of claim 15, wherein a width of the third data line is smaller than a width of the first data line and/or the second data line.

17. The display device of claim 1, further comprising:
a liquid crystal layer disposed on the substrate;
a common electrode disposed between the liquid crystal layer and the plurality of data lines:
wherein the common electrode disposed on the first and second color filters.

18. The display device of claim 17, further comprising:
a light blocking member disposed on the second color filter between the substrate and the liquid crystal layer.

19. The display device of claim 1, wherein:
a top surface of first dummy color filter is covered by the third color filter and the second color filter; and
a top surface of the second dummy color filter is exposed from the first color filter and the second color filter.

20. A manufacturing method of a display device, the method comprising:
disposing a plurality of data lines on a substrate;
disposing a first color filter at a region between a first data line and a second data line, among the plurality of data lines, and a first dummy color filter to overlap a third data line that is adjacent to the first data line, among the plurality of data lines, and to be separated from the first color filter by coating a first color filter material on the substrate and the plurality of data lines and exposing the first color filter material with a photomask comprising a halftone region;
disposing a second color filter at a region between the third data line and a fourth data line that is adjacent to the third data line, among the plurality of data lines, and disposing a second dummy color filter to overlap the first data line and to be separated from the second color filter by coating a second color filter material on the substrate and the plurality of data lines and exposing the second color filter material, wherein the second color filter is disposed on the first dummy color filter; and
disposing a third color filter at a region between the first data line and the third data line and on the first dummy color filter by coating a third color filter material on the substrate and the plurality of data lines and exposing the third color filter material,
wherein the first dummy color filter is formed to correspond to the halftone region of the photomask,
wherein a surface of the third color filter facing the substrate is disposed on the second dummy color filter, and
wherein a width of the first data line and/or the third data line is smaller than a width of the second data line.

21. The manufacturing method of claim 20, wherein the disposing of the third color filter comprises disposing a third dummy color filter on the first color filter to overlap the second data line and to be separated from the third color filter.

22. The manufacturing method of claim 20,
wherein a surface of first dummy color filter facing the substrate is disposed on the second color filter.

23. The manufacturing method of claim 20, wherein:
a top surface of first dummy color filter is covered by the third color filter and the second color filter; and
a top surface of the second dummy color filter is exposed from the first color filter and the third color filter.

* * * * *